J. FROSIG & L. W. WALSTROM.
VEHICLE SPRING.
APPLICATION FILED NOV. 18, 1912.

1,076,414.

Patented Oct. 21, 1913.

INVENTOR

WITNESSES:

UNITED STATES PATENT OFFICE.

JEFF FROSIG AND LEE W. WALSTROM, OF RENO, NEVADA.

VEHICLE-SPRING.

1,076,414. Specification of Letters Patent. Patented Oct. 21, 1913.

Application filed November 18, 1912. Serial No. 732,103.

*To all whom it may concern:*

Be it known that we, JEFF FROSIG and LEE W. WALSTROM, citizens of the United States, residing at Reno, in the county of Washoe and State of Nevada, have invented certain new and useful Improvements in Vehicle-Springs, of which the following is a specification.

Our invention relates to improvements in vehicle springs, and particularly to an improvement in springs for automobiles.

The object of our invention is to provide means whereby a limited amount of angular displacement between a vehicle body and its running gear may take place, this movement being cushioned, that is to say opposed by a resilient force, while at the same time the same cushioning means will also serve to reinforce the leaf springs, not suddenly but gradually and increasingly.

The invention will be more fully understood after a consideration of the description hereinafter of one embodiment thereof taken in connection with the accompanying drawings forming a part of this application.

Figure 1:
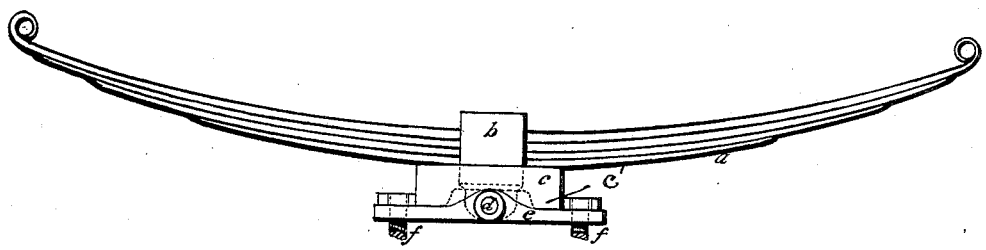
Figure 2:
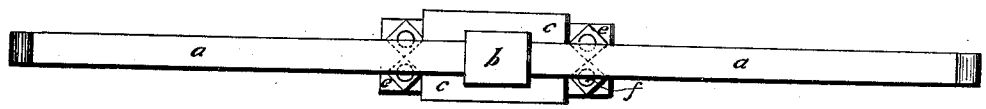
Figure 3:
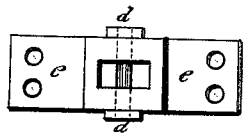
Figure 4:
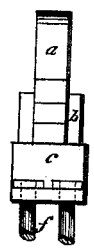
Figure 5:
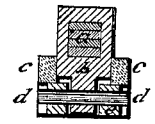

In the drawings,—Figure 1 is a side elevation of a device embodying the invention; Fig. 2 a plan view of the same; Fig. 3 a detail plan view of the bearing member; Fig. 4 an end elevation of the device shown in Fig. 1, and Fig. 5 a central transverse section of the same.

Referring to the drawings, A is a composite spring of the usual form comprising a plurality of leaf springs of different lengths. These are secured together by being fitted tightly at their central portions into sockets formed in a clip-member $b$, which is connected by a suitable hinge joint to a bearing plate $e$, arranged to be attached to the running gear of the vehicle in any suitable way, as for example by means of bolts and nuts, indicated at $f$.

The hinge connection between the clip-member $b$ and the bearing plate $e$ is most advantageously arranged by providing the clip-member $b$ with a reduced portion which enters the space between two lugs forming part of said bearing plate, a pintle pin $d$ passing through the said lugs and the said reduced portion.

Between the spring device $a$ and the bearing-plate $e$ is arranged a solid block of resilient material such as rubber, the particular construction and arrangement of this resilient block constituting an important feature of the present invention, as will now be described. This resilient block, indicated at $c$ is provided at its ends with projecting portions $c'$ which may be termed feet, which contact with the bearing plate, the portion of the resilient block intermediate these feet being out of contact with the bearing plate $e$, as will be clear from Fig. 1. It is to be observed that the inner walls of the end portions or feet $c'$ slope toward the clip-member $b$ in such a way that the portions of the block nearest the clip-member are properly supported by the feet. The resilient block $c$ has an opening through which passes the clip-member $b$, which is polygonal in cross-section, in the present example, rectangular, and which completely fills the said opening in the resilient block.

The result of the construction and arrangement of the resilient block as above described is that when the spring $a$ is deflected by shocks so as to tend to straighten out, it compresses the resilient block $c$, the amount of the compression depending upon the amount of the deflection of said spring $a$, the compression commencing nearest the clip-member $b$ and on each side of the same and extending from these places outward toward the ends of the blocks $c$, so that the more the spring $a$ is deflected the greater is the amount of support furnished to said spring $a$ by the block $c$, not merely by virtue of a greater compression of a given area of the block $c$, but also by a greater area of such block brought under compression. This enables the block, although of a relatively small size, to give an important amount of support to the spring $a$ and in proportion to the need for such support. In addition, however, to the support given by the block to the spring during the deflection of said spring, the said block also acts as a resilient member to return the clip-member $b$ to its intermediate or central position, as shown in Fig. 1, when moved angularly about its pivot pin $d$, in which case the block $c$ is compressed only on that side toward which the clip-member $b$ is moved. Besides the resistance of the block normal to the spring $a$, it also reacts resiliently against the clip-member $b$ when the latter moves angularly, but owing to the inclined slope of the inner walls of the feet, as above explained, this reaction is brought largely against the bearing plate *e* instead of being a mere shearing stress on the rubber.

Having thus fully described our invention, what we claim is:

1. In a vehicle spring device, the combination, with a substantially horizontal bearing plate, and a clip-member of polygonal cross-section hinged to said plate, of a leaf-spring device extending through and held by said clip, and an integral resilient block entirely surrounding said clip-member and bearing against the bearing plate and against the leaf-spring device at each side of the clip-member, whereby the resilient block reinforces the leaf-spring device when the latter is flexed downward.

2. In a vehicle spring device, the combination, with a bearing-plate, having central lugs and a clip-member having a reduced portion arranged between the said lugs, a pintle passing through the said lugs and the said reduced portion whereby the clip-member is hinged to the bearing plate, said clip-member having a spring-receiving opening and being polygonal in cross-section, of a spring member comprising a plurality of leaf-springs passing through the opening in the clip-member and extending in opposite directions from said clip-member, and a resilient block surrounding the clip-member and provided with feet having their inner walls sloping toward the clip member, said resilient block filling the space between the spring member and the bearing plate with its feet in contact with the latter.

In witness whereof we have hereunto affixed our hands this 12" day of November 1912.

JEFF FROSIG.
LEE W. WALSTROM.

Witnesses:
BRENETTA E. DONLIN,
E. R. DODGE.

Copies of this patent may be obtained for five cents each, by addressing the "Commissioner of Patents, Washington, D. C."